US009633363B2

(12) United States Patent
Price et al.

(10) Patent No.: US 9,633,363 B2
(45) Date of Patent: Apr. 25, 2017

(54) SYSTEM AND METHOD OF INCENTIVIZED ADVERTISING

(71) Applicant: THNX, LLC, Santa Monica, CA (US)

(72) Inventors: Timothy James Price, Manhattan Beach, CA (US); Antonina Armato, Manhattan Beach, CA (US); Jason Yang, Hacienda Heights, CA (US)

(73) Assignee: THNX, LLC, Santa Monica, CA (US)

( * ) Notice: Subject to any disclaimer, the term of this patent is extended or adjusted under 35 U.S.C. 154(b) by 0 days.

(21) Appl. No.: 14/076,103

(22) Filed: Nov. 8, 2013

(65) Prior Publication Data

US 2014/0067516 A1    Mar. 6, 2014

Related U.S. Application Data

(60) Provisional application No. 61/843,265, filed on Jul. 5, 2013, provisional application No. 61/723,915, filed on Nov. 8, 2012.

(51) Int. Cl.
G06Q 30/02     (2012.01)
G06Q 50/00     (2012.01)

(52) U.S. Cl.
CPC ..... *G06Q 30/0239* (2013.01); *G06Q 30/0222* (2013.01); *G06Q 30/0253* (2013.01); *G06Q 50/01* (2013.01)

(58) Field of Classification Search
CPC .................................................. G06Q 30/0239

(Continued)

(56) References Cited

U.S. PATENT DOCUMENTS 5,191,573 A    3/1993 Hair
5,675,734 A    10/1997 Hair
(Continued)

FOREIGN PATENT DOCUMENTS

EP    0913789    5/1999
JP    2004-086696 A    3/2004
(Continued)

OTHER PUBLICATIONS

Alexander, S. "Free . . . usually carry a cost," startribune.com, Jan. 31, 2000, 5 pgs.

(Continued)

*Primary Examiner* — Matthew T Sittner
*Assistant Examiner* — Azam Ansari
(74) *Attorney, Agent, or Firm* — Knobbe, Martens, Olson & Bear LLP

(57) ABSTRACT

Exemplary embodiments of methods and systems of incentivized advertising are presented. A content identifier identifying a digital content item, such as a song, is displayed on a user computing device. The digital content item is typically of the type available for a purchase price by the general public. A selection icon is provided in visual association with the content identifier. If the icon is selected by the user, an advertisement media item, such as a video advertisement, is presented on the user computing device. If the advertisement media item is presented for at least a requisite ad impression period, the digital content item is imparted to the user for free. Follow-up ad engagement views are typically presented to the user with a button to redeem the earned digital content item. Administrator and server elements are configured to facilitate performance of the method, and to optimize efficient use of advertiser's budget.

34 Claims, 5 Drawing Sheets

(58) Field of Classification Search
USPC .............................................. 705/14.1, 14.39
See application file for complete search history.

(56) References Cited

U.S. PATENT DOCUMENTS

| | | |
|---|---|---|
| 5,774,869 A | 6/1998 | Toader |
| 5,774,870 A | 6/1998 | Storey |
| 5,794,210 A | 8/1998 | Goldhaber et al. |
| 5,838,314 A | 11/1998 | Neel et al. |
| 5,855,008 A | 12/1998 | Goldhaber et al. |
| 5,991,736 A | 11/1999 | Ferguson et al. |
| 6,084,628 A | 7/2000 | Sawyer |
| 6,102,406 A | 8/2000 | Miles et al. |
| 6,119,098 A | 9/2000 | Guyot et al. |
| 6,128,651 A | 10/2000 | Cezar |
| 6,141,010 A | 10/2000 | Hoyle |
| 6,161,127 A | 12/2000 | Cezar et al. |
| 6,161,142 A | 12/2000 | Wolfe et al. |
| 6,169,542 B1 | 1/2001 | Hooks et al. |
| 6,178,446 B1 | 1/2001 | Gersberg et al. |
| 6,182,050 B1 | 1/2001 | Ballard |
| 6,216,112 B1 | 4/2001 | Fuller et al. |
| 6,216,129 B1 | 4/2001 | Eldering |
| 6,275,854 B1 | 8/2001 | Himmel et al. |
| 6,385,596 B1 | 5/2002 | Wiser et al. |
| 6,505,773 B1 * | 1/2003 | Palmer et al. ................ 235/380 |
| 6,529,878 B2 | 3/2003 | De Rafael et al. |
| 6,560,578 B2 | 5/2003 | Eldering |
| 6,604,242 B1 | 8/2003 | Weinstein et al. |
| 6,658,568 B1 | 12/2003 | Ginter et al. |
| 7,062,510 B1 | 6/2006 | Eldering |
| 7,318,036 B2 | 1/2008 | Kim et al. |
| 7,346,545 B2 | 3/2008 | Jones |
| 8,150,727 B2 * | 4/2012 | McCourt ..................... 705/14.49 |
| 8,190,474 B2 * | 5/2012 | Lerman et al. ............. 705/14.41 |
| 8,229,790 B2 | 7/2012 | Wald et al. |
| 8,438,504 B2 * | 5/2013 | Cranfill et al. ............... 715/863 |
| 8,612,375 B2 | 12/2013 | Weinstein et al. |
| 8,706,673 B2 | 4/2014 | Weinstein et al. |
| 8,732,010 B1 * | 5/2014 | Parikh et al. ................ 705/14.1 |
| 8,732,739 B2 | 5/2014 | Sillerman |
| 8,768,757 B2 * | 7/2014 | Antonov et al. ............ 705/14.1 |
| 2002/0116360 A1 * | 8/2002 | Oh et al. ......................... 707/1 |
| 2002/0194058 A1 | 12/2002 | Eldering |
| 2006/0041893 A1 | 2/2006 | Castro et al. |
| 2006/0069808 A1 | 3/2006 | Mitchell et al. |
| 2006/0212401 A1 * | 9/2006 | Ameerally et al. ............. 705/51 |
| 2007/0121843 A1 * | 5/2007 | Atazky et al. ........... 379/114.13 |
| 2007/0255965 A1 | 11/2007 | McGucken |
| 2007/0265910 A1 | 11/2007 | Varghese |
| 2007/0288951 A1 | 12/2007 | Ray et al. |
| 2007/0294292 A1 * | 12/2007 | Hydrie et al. ............. 707/104.1 |
| 2008/0052171 A1 | 2/2008 | Eldering |
| 2008/0092159 A1 | 4/2008 | Dmitriev et al. |
| 2008/0221986 A1 | 9/2008 | Soicher et al. |
| 2008/0221997 A1 * | 9/2008 | Wolfe .............................. 705/14 |
| 2009/0044216 A1 | 2/2009 | McNicoll |
| 2009/0063283 A1 | 3/2009 | Kusumoto et al. |
| 2009/0199230 A1 | 8/2009 | Kumar et al. |
| 2009/0234784 A1 | 9/2009 | Buriano et al. |
| 2009/0300670 A1 | 12/2009 | Barish |
| 2010/0017278 A1 | 1/2010 | Wilen et al. |
| 2010/0100925 A1 | 4/2010 | Hinton |
| 2010/0114655 A1 | 5/2010 | D'Elia |
| 2010/0161398 A1 | 6/2010 | Albert et al. |
| 2010/0306402 A1 | 12/2010 | Russell et al. |
| 2010/0314276 A1 | 12/2010 | Wilen |
| 2011/0025037 A1 | 2/2011 | Wilen |
| 2011/0044153 A1 | 2/2011 | Simon et al. |
| 2011/0060723 A1 | 3/2011 | Harper et al. |
| 2011/0067045 A1 | 3/2011 | Matheny et al. |
| 2011/0124390 A1 | 5/2011 | Wilen |
| 2011/0258026 A1 | 10/2011 | Prince |
| 2011/0282896 A1 | 11/2011 | Kaila et al. |
| 2011/0295683 A1 * | 12/2011 | Mak ........................... 705/14.49 |
| 2012/0054015 A1 | 3/2012 | Wu |
| 2012/0066068 A1 | 3/2012 | Pan |
| 2012/0079521 A1 | 3/2012 | Garg et al. |
| 2012/0110620 A1 * | 5/2012 | Kilar et al. ..................... 725/34 |
| 2012/0197724 A1 | 8/2012 | Kendall |
| 2012/0272256 A1 | 10/2012 | Bedi |
| 2012/0272258 A1 | 10/2012 | Bedi |
| 2012/0272278 A1 | 10/2012 | Bedi |
| 2013/0080262 A1 | 3/2013 | Scott |
| 2014/0067953 A1 | 3/2014 | Weinstein et al. |
| 2014/0165218 A1 | 6/2014 | Lin et al. |

FOREIGN PATENT DOCUMENTS

| | | |
|---|---|---|
| KR | 2002-0062219 A | 7/2002 |
| WO | WO 02-091257 | 11/2002 |
| WO | WO 2012/145558 | 10/2012 |

OTHER PUBLICATIONS

Clixsense—earn up to $5 per Click!, http://www.youtube.com/watch?v=mhND8Esjl-k&feature=related (last visited Nov. 14, 2011), 2 pgs.

Earn Money By Clicking Ads Get Paid Instantly To PayPal/Alertpay Account,http://www.youtube.com/watch?v=4KPdxR6UKzg&feature=related (last visited Nov. 14, 2011), 3 pgs.

Ebenkamp, B., "Gold on that thar Web," Brandweek, Jul. 15, 1996, v37 n29 p. 17, 3 pgs.

Get Paid To Click $5 To Click Ad's $25 Just For Signing Up | Free Sign Up | I've Already Earned, http://www.youtube.com/watch?v=OuLK6aXHDeE&feature=related (last visited Nov. 14, 2011), 2 pgs.

Get Paid to Click 30 Ads a Day, http://www.youtube.com/watch?v=p3gua55MpCk&feature=related (last visited Nov. 14, 2011), 2 pgs.

Get Paid To Click Ads (Make Money Clicking Ads) Free to Join! Earn monthly paychecks file:///Users/parambedi/Desktop/YouTube%20-%20GET%20PAID%20TO%20...20JOIN!%20Earn%20monthly%20paychecks%20viewing%20ads.webarchive (last visited Nov. 14, 2011), 2 pgs.

Get Paid To View Ads. No Age Restrictions!!—NeoBux, http://www.youtube.com/watch?v=fkfP617HLWY&feature=related (last visited Nov. 14, 2011), 2 pgs.

How to Get $350 Online for Clicking Adds!, http://www.youtube.com/watch?v=BVOKYNY0IuE&feature=related (last visited Nov. 14, 2011), 2 pgs.

International Search Report and Written Opinion dated Feb. 20, 2014 for International Application No. PCT/US2013/069338.

International Search Report and Written Opinion dated Oct. 29, 2012 for International Application No. PCT/US2012/034319.

Make Money by Clicking Ads—RastaBux, http://www.youtube.com/watch?v=tgTo4hpDI3E&feature=related (last visited Nov. 14, 2011), 3 pgs.

Blodget and Gobry, Spotify Announces "Spotify Radio"—Presumably A Pandora-Killer, http://www.businessinsider.com/spotify-radio-2011-12, Dec. 9, 2011.

Gideon, Tim, 'Slacker' Music Service Combines Player, Recommendations, http://www.pcmag.com/article2/0,2817,2103558,00.asp, Mar. 13, 2007.

Hefflinger, Social Music Service Rdio Officially Launches, http://www.dmwmedia.com/news/2010/08/03/social-music-service-rdio-officially-launches, Aug. 3, 2010.

Moscaritolo, Spotify Adding Free Mobile Radio for iPhone, iPad, http://www.pcmag.com/article2/0,2817,2406003,00.asp, Jun. 19, 2012.

Perez, iHeartRadio Launches Developer API, http://techcrunch.com/2012/01/10/iheartradio-launches-developer-api/, Jan. 10, 2012.

International Preliminary Report on Patentability dated May 21, 2015 for International Application No. PCT/US2013/069338.

* cited by examiner

SYSTEM AND METHOD OF INCENTIVIZED ADVERTISING

RELATED APPLICATIONS

This application claims the benefit of U.S. Provisional Application No. 61/723,915, filed on Nov. 8, 2012, and U.S. Provisional Application No. 61/843,265, filed on Jul. 5, 2013, the contents of each of which are incorporated by this reference in their entirety for all purposes as if fully set forth herein.

TECHNICAL FIELD

The present invention relates generally to electronic advertising in which the user's attention or interaction with the advertisement is rewarded.

BACKGROUND

While mobile advertising has been the booming epicenter of advertising, record sales have been slow to recover from the digital revolution. What is needed are systems, methods and software applications which bridge the gap between and mutually benefit advertisers, record labels, record retailers and users.

SUMMARY

Certain deficiencies of the prior art may be overcome by the provision of a system and method which, in certain preferred embodiments, bridge the world of mobile advertising with that of record sales. A software platform is provided which enables advertisers to create focused campaigns to build impressions of their brand and directly market their products. Embodiments efficiently serve advertisers' end goals by directing the users' attention toward designated videos, landing pages, social engagement pages, and email messages.

Embodiments may be configured to provide advertisers the ability to target users by virtue of the users' real-time location, demographics, interests (i.e., "secondary user data"), etc. Embodiments provide advertisers the ability to engage in focused conversations with their audience, and build lasting and positive associations of their brand by bridging the engagement with a gift.

Preferred embodiments of the invention benefit users by providing them with a legal and reliable alternative channel to buying and streaming music and other digital content. By giving a moment of their time and attention to engage with the advertisers' media content, they will be rewarded with a DRM-free audio or audio-video content item of their selection with no further strings attached. Participating record labels, artists, and music retailers will experience increases in sales based on their established sales models, fueled by a new stream of money from the advertising industry.

The systems, methods and software platforms of embodiments of the invention are highly adaptable, and can be integrated into a variety of different environments and products. For example, the app can be adapted and rebadged under the name of an existing restricted music steaming service and turn it into a new platform where users can legally redeem music for free. Alternatively, a software platform in accordance with the present invention may be easily integrated into existing media player/library applications, where users would be able to either buy or redeem their music for free, giving such an existing media/library application a new channel of sales.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
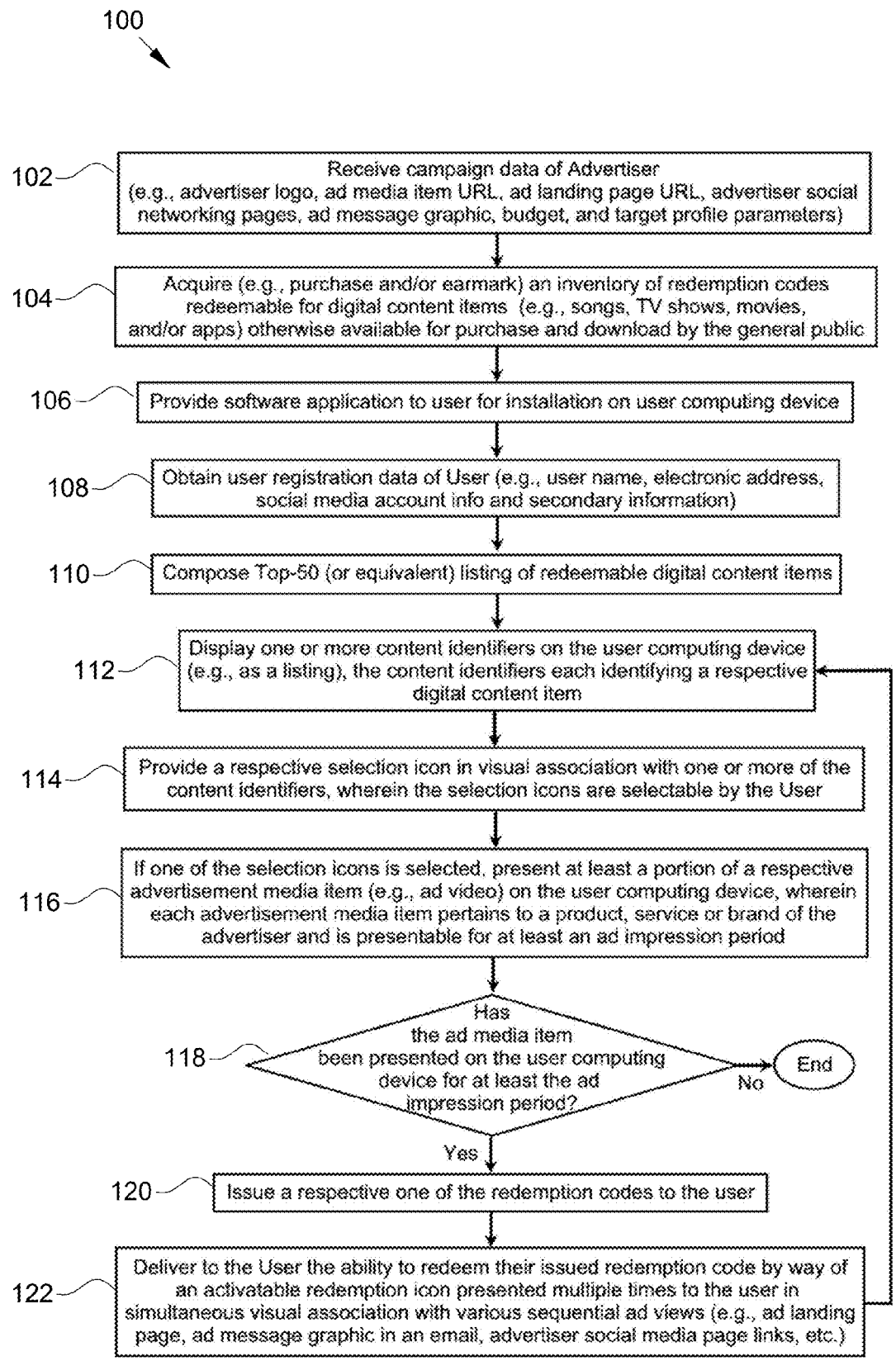
FIG. 1 illustrates a flow diagram generally depicting the steps of one or more non-limiting examples of a method in accordance with the present invention.

Referring to the drawings, like reference numerals designate identical or corresponding features throughout the several views.

Exemplary embodiments of the invention comprise a method of or system for incentivized advertising. For example, certain embodiments of a method may comprise one or more of the steps of illustrated in FIG. 1. At block 112, a content identifier (e.g., a song title) may be displayed on a user computing device. Such content identifier may, for example, identify a digital content item, such as a song, TV show, movie, downloadable software app, or the like. Such digital content items are typically of the type available for a purchase price by the general public. At block 114, a selection icon (see, for example, 172 in FIG. 3) may be provided in visual association with the content identifier, wherein the selection icon is preferably selectable by the user. In certain preferred embodiments, the selection icon 172 may further be provided in visual association with, for example, the name or a logo of the advertiser. At block 116, if the selection icon is selected, at least a portion of an advertisement media item is presented on the user computing device. The advertisement media item (e.g., a video advertisement) would preferably pertain to a product, service or brand of an advertiser and would be presentable for at least an ad impression period. At blocks 118 and 120, if the advertisement media item is presented on the user computing device for at least the ad impression period, the digital content item is imparted to the user at a discount. The discount may be a reduction in the purchase price or for free.

In certain embodiments, the step of imparting is accomplished by issuing a respective redemption code to the user. The redemption code would typically be redeemable in exchange for the digital content item at the discount. In such embodiments, for example, the redemption code may be represented by an activatable redemption icon presented in simultaneous visual association with a message graphic, the message graphic depicting at least one or more of a product, service or brand of the advertiser. The redemption code may be issued by way of an email. Moreover, in preferred embodiments, the redemption code may electronically transferable by the user to a transferee, thereby allowing the transferee to redeem the redemption code.

In particular embodiments of a method in accordance with the present invention, the digital content item is chosen from the group consisting of a song, a TV episode, a movie, a game, and a software application. Moreover, the advertisement media item (which may be otherwise referred to herein as an "ad media item") may be a video advertisement. In preferred such embodiments, the video advertisement may be streamed from a video server element, such as the video-sharing website 134 represented in FIG. 2.

The ad impression period may be defined and implemented in various ways from one embodiment to the next. By way of example, the ad impression period may be the full length of the video advertisement. Alternatively, the ad impression period may be established as a fixed amount of time (e.g., 20 seconds, 30 seconds, etc.) equal to or less than the full length of the video advertisement. In further alternative, the ad impression period may be an amount of time calculated as a fixed percentage of the full length of the video advertisement. For example, the app 126 running on the user computing device may be configured to require that the the video advertisement is presented (e.g., played) for at least 50% of the actual full video length before a redemption code may be issued to the respective user.

Referring to block 122 of FIG. 1, certain preferred embodiments of the methods described herein may comprise the further step of exhibiting, on the user computing device 128, an advertiser landing page (see, for example, reference character 180 in FIG. 7) after the advertisement media item has been presented for at least the ad impression period. The landing page may preferably be a web page of the advertiser accessed or otherwise provided by way of the ad landing page URL. Further, after the step of imparting or issuing a redemption code to a user, a social media landing page (see, for example, FIG. 10) may be revealed on the user computing device 128. The social media landing page may include one or more selectable links (e.g., on icons or buttons 186 and 188) by which the user may enter one or more respective social networking pages of the advertiser.

Figure 2:
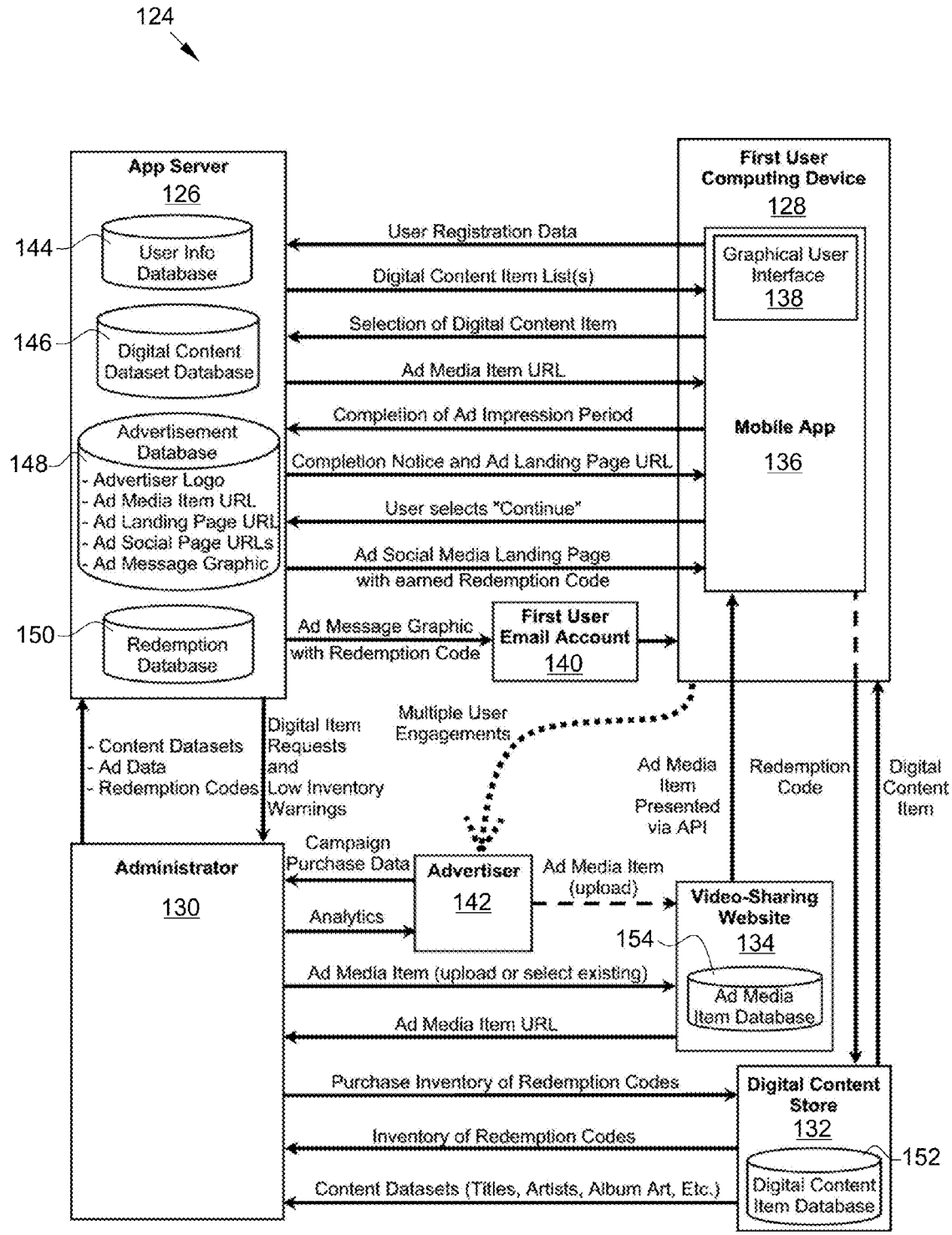
FIG. 2 illustrates a block diagram of one or more non-limiting examples of a system and associated workflow in accordance with the present invention.
Figure 8:
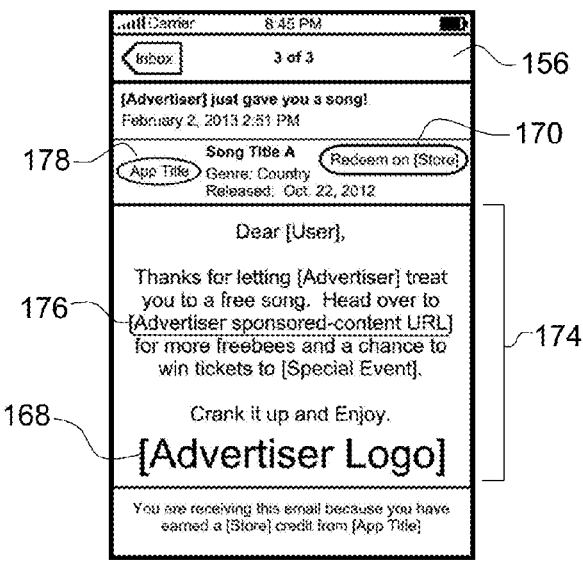
FIG. 8 illustrates one example of a redemption email view, wherein a redemption button may be provided in addition to details about the earned digital content item and an advertiser message graphic.

Embodiments may involve a non-transitory, computer readable storage medium storing a program that causes a user computing device, such as the one represented at 128 in FIG. 2, to conduct a method comprising one or more steps, such as those depicted in FIGS. 1 and 2. For example, referring block 112, a content identifier may be displayed on the user computing device. The content identifier (e.g., song title) identifies a digital content item (e.g., a song) typically being of the type available for a purchase price by the general public through, for example, an Internet-accessible digital content store. At block 114, a selection icon (such as the one illustrated at 172 in FIG. 3) may be provided in visual association with the content identifier, wherein the selection icon is selectable by the user. At block 116, if the selection icon is selected by the user, at least a portion of a video advertisement is presented on the user computing device 128. The video advertisement may preferably be streamed from a remote server (see, for example 134 in FIG. 2), would pertain to a product, service or brand of an advertiser and would be presentable for at least an ad impression period. In embodiments, such remote server 134 may preferably be operated by a third party. At block 118-120, if the video advertisement is presented for at least the ad impression period, the digital content item may be caused to be imparted to the user for free by way of a redemption code. Referring to FIG. 8 for example, such redemption code may preferably be represented by an activatable redemption icon (button) 170. The redemption button 170 may, for example, be presented in simultaneous visual association with a message graphic 174. A message graphic 174 may be in the form of a thank you message, and may typically depict at least one or more of a product, service or brand (e.g., logo 168) of the advertiser. Such a message graphic may also contain a further clickable link to, for example, an advertiser sponsored-content URL (see, for example, 176 in FIG. 8).

Figure 9:
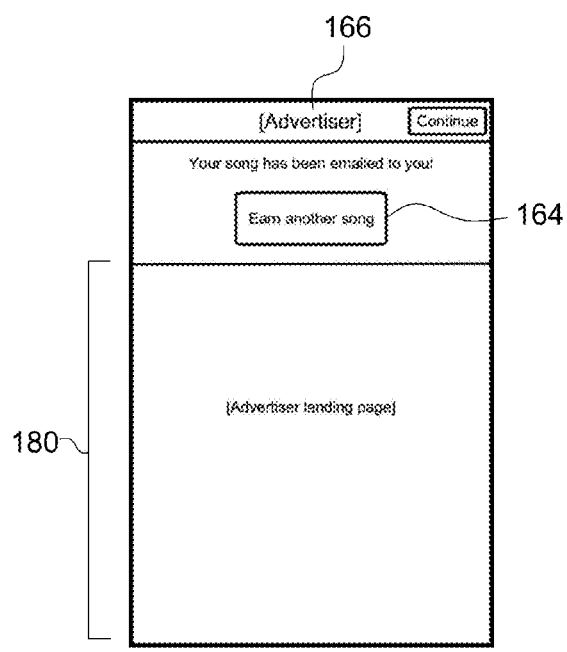
FIG. 9 illustrates one example of an alternative advertiser landing view similar to that of FIG. 7, but wherein a "continue" button is provided which may result in navigation to a social media landing page.
Figure 10:
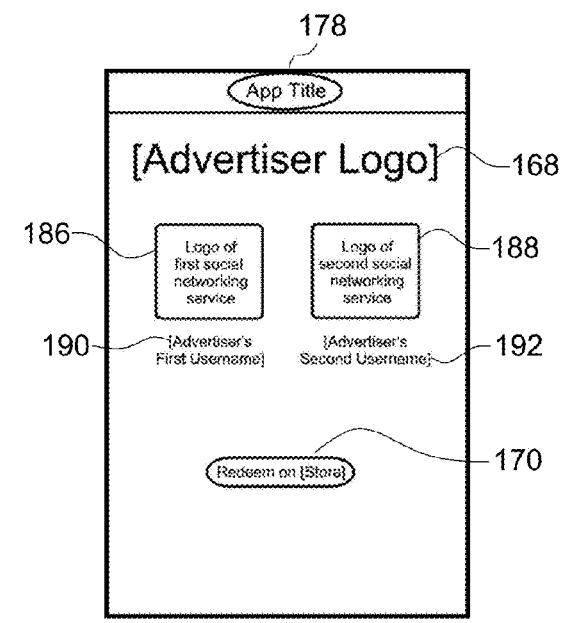
FIG. 10 illustrates one example of a social media landing page hosting one or more social media pages of the respective advertiser and providing a further location from which the user may select the redemption button.

In particular embodiments of the non-transitory computer-readable storage medium, the method may comprise further steps. Referring to FIGS. 9 and 10, after the video advertisement has been presented for at least the ad impression period, an advertiser landing page 180 may be exhibited on the user computing device. In addition, for example after the user presses the "continue" button illustrated at the top right of the view in FIG. 9, a social media landing page (as illustrated in FIG. 10) may be revealed on the user computing device. As shown in FIG. 10 for non-limiting illustration, the social media landing page may include one or more selectable links (e.g., the icons or buttons at 186 and 188) by which the user may enter one or more respective social networking pages of the advertiser. The advertiser's usernames (e.g., as shown at 190 and 192) corresponding to each of the social media pages may also be depicted on the social media landing page.

Referring again to FIGS. 1 and 2, a method in accordance with the present invention may be described or defined to include further steps and components. For example, at block 102, campaign data (what may otherwise be referred to herein as "campaign purchase data") of an advertiser may be received by, for example, an administrator element 130. The campaign data may preferably include, for example, one or more of an advertiser name, an ad media item URL and an ad landing page URL. The administrator element 130 may be one or more natural persons, one or more computers (e.g., servers or related components), or a combination thereof. At block 104, an inventory of redemption codes may be acquired (e.g., purchased or earmarked) from or by, for example, a digital content store 132. As indicated before, the redemption codes would typically be of the type redeemable in exchange for respective digital content items otherwise available for a purchase price by the general public (e.g., directly from the digital content store 132). At block 106, a software application 136 is provided (e.g., by way of an Internet-accessible "app store") for installation on a user computing device 128 of a user. Such software application 136 may have a respective name or logo which may be displayed, for example, as shown at 178 in FIGS. 3, 8 and 10.

Returning to FIGS. 1 and 2, the software application 136 may preferably be configured to enable performance of a subseries of steps specifically performed by or through the user computing device. For example, at block 112, one or more content identifiers may be displayed on the user computing device, wherein the content identifiers each identify a respective one of the digital content items. At block 114, a respective selection icon may be provided in visual association with one or more of the content identifiers, wherein the selection icons are selectable by the user. At block 116, if one of the selection icons is selected, at least a portion of a respective advertisement media item is presented (e.g., played) on the user computing device, wherein each advertisement media item pertains to a product, service or brand of the advertiser and is presentable for at least an ad impression period. The presentation of the advertisement media item on the user computing device may preferably be by way of direct streaming from a third party remote server 134.

Once the software application 136 is downloaded and installed on the user computing device 128, user registration data of the respective user may be obtained. Such user registration data may preferably include an electronic address (e.g., email address) of the respective registering user. At block 118, the system 124 (by way of or in coordination with the functionality of the software application 136) verifies whether the respective advertisement media item was presented for at least the requisite ad impression period. If it was, a respective one of the redemption codes is issued to the user. Referring to FIGS. 8 and 10 for example, the redemption code is preferably represented by an activatable redemption icon 170 presentable in simultaneous visual association with at least one ad view (e.g., advertisement message graphic 174 and/or social media landing page (illustrated at FIG. 10)). Each ad view typically depicts at least one or more of a product, service or brand of the advertiser.

Figure 7:
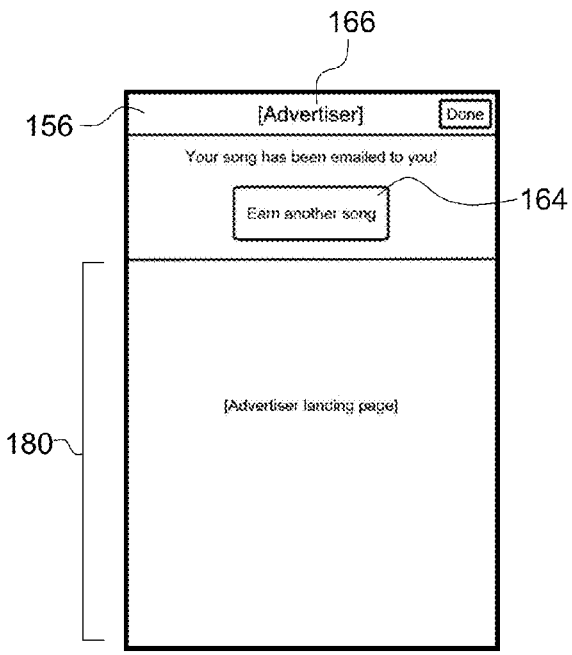
FIG. 7 illustrates one example of an advertiser landing view, wherein most or all of the view may be derived from the advertiser's mobile web page.

In certain embodiments of the method, the message graphic 174 may be included in the campaign data. As illustrated in FIG. 8, the redemption code may be issued at least by way of the electronic address, wherein the respective ad view is the message graphic 174. Alternatively or in addition, as illustrated in FIGS. 7 and 9, at least one of the ad views may be an ad landing page 180 presentable by way of the ad landing page URL.

Methods discussed herein may be carried out in a manner which involves further details and steps. For example, the step of acquiring campaign data is preferably performed for each of a multiplicity of advertisers. Similarly, the steps of providing the software application 136 and obtaining user registration data are preferably performed for each of a plurality of users (for example, each by way of a respective user computing device 128). In such embodiments, it is particularly valuable to allow advertisers to apply their campaign budgets in a manner which targets those users who are more likely to purchase their products or services. To accommodate this, certain of the methods discussed herein may comprise additional target marketing steps or features. The campaign data may include one or more target profile parameters elected by the respective advertiser, the target profile parameters including one or more of the demographic, geographic location and interests of targeted users. Relatedly, the user registration data may include secondary user data, the secondary user data including one or more of the demographic, geographic location and interests of the respective user. Further, the computing device may provide additional data, such as the active method of internet connections, its user's current micro locations, etc. Finally, a rule may be applied by a portion of the system (e.g., server 126) whereby the advertisement media item presented to each respective user is based, at least in part, on a match between the target profile parameters of the respective advertiser and the secondary user data of the respective user.

Referring again to FIG. 2, a system 124 for incentivized targeted advertising may comprise an administrator element 130 and a server element 126. The server element 126 may include or be in electronic communication with one or more of a user info database 144, digital content dataset database 146, advertisement database 148 and redemption database 150. The administrator element 130 may be configured to: (a) receive campaign data of an advertiser, including at least an advertiser name and an ad media item URL and (b) acquire an inventory of redemption codes. The server element 126 may be configured to: (i) be in electronic communication between the administrator element 130 and a user computing device 128 of a user; (ii) receive the campaign data from the administrator element 130; (iii) receive user registration data from the user computing device 128; (iv) provide one or more content identifiers to the user computing device 128 for display thereon (e.g., by way of a GUI 138), (v) receive a verification from the user computing device 128 that an ad media item has been played thereon for at least an ad impression period, wherein the ad media item pertains to a product, service or brand of the advertiser and is accessible by the user computing device 128 by way of, for example, the ad media item URL; and (vi) once the verification has been received (e.g., by the server 126), issuing a respective one of the redemption codes to the user. Referring to FIGS. 8 and 10, such redemption code may preferably be represented by an activatable redemption icon 170 presentable in simultaneous visual association with at least one ad view. Each ad view would generally depict at least one or more of a product, service or brand of the advertiser.

In certain preferred embodiments, the administrator element 130 may be comprised substantially of one or more computers. Further, the administrator element 130 may form an integral portion of the server element 126.

Embodiments of the present invention provide more direct engagement between the advertiser and the user of electronic media. For example, the user may be gifted DRM-free music for taking the time to view or listen to advertisements which may be targeted directly to that user or their demographic. As a reward for their engagement of the advertising content, the user is able to own and/or stream their selected music content or other digital content item for free. Advertisers are provided a new channel by which to deliver user-interest targeted ads, both nationwide and local geo-targeted ads. The ads may be user-interest based, wherein the app and related system components detect user interests based on the content generated from the user's own social media pages.

Advertisers 142 may take part in designing the ad by specifying the targeted ad video as well as a landing page. They may place bids on user's interest keywords and user locations (e.g., which may be included in the secondary user data). In preferred embodiments, advertisers may be charged only when users finish watching the video and interacting with the advertiser's landing page. By way of example, Advertiser X may select a campaign budget of $129, a portion of which goes to an administrator's purchase of an inventory of redemption codes for 100 songs. The system serves 120 video engagements, 110 landing page engagements, 4 social engagements and 75 email engagements at more competitive cost-per-engagement (CPE) rates than conventional CPE rates. In particular embodiments, Advertisers can also bid on specific songs (or other digital content item) to associate with their campaign, and receive analytics including user demographics, CPM, CTR and CPE.

Preferred embodiments of the invention allow users to sign into the app 136 with their social network accounts (e.g., Facebook® or Twitter®). They may then browse a top-50 chart (or the like), and/or search for any song in, for example, a digital content store 132 such as iTunes® or other media content library. The user may redeem a free song after watching a video ad targeted to their interests and/or location. The user may be directed to the advertiser's web page in-app, for example, as their song is being downloaded.

Features of Specific Preferred Embodiments

Users are rewarded with redemption codes for iTunes® (or similar digital content store with a digital content item database 152) for watching sponsored videos. An inventory of redemption codes may be stored in a server-side database 150. Redemption codes may be delivered to users via their email account 140 upon successful completion of a sponsored video advertisement.

Video advertisement content may be hosted in YouTube® and delivered via the YouTube® API. Users must complete the video advertisements (or a predetermined portion thereof) in order to earn redemption codes.

The curated Top 50 list may be delivered via private server API. Users may browse the Top 50 list or search the entire iTunes® catalog (or equivalent). All music metadata, song previews, and query search results may preferably be delivered via the iTunes Search API (or the like).

90-second song previews may be streamed from, for example, iTunes upon tapping the album artwork for an available song within the Top 50 or Search Library pages. Start/Stop controls, download progress, and play progress may be displayed in place of the album art.

Users may be required to authenticate via their social network login (e.g., Facebook®) in order to gain the full functionality of the app 136. Future live releases of the app may include a walk-through tutorial upon initial launch of the app. Integration with the user's social networks would serve to verify user identity, gather demographic data for ad targeting purposes, and to acquire users' email addresses for song redemption emails.

Advertisers may be provided with analytics integrated with the app to track user behavior, demographics and other custom events.

A launch screen (not shown) may comprise a static image displayed each time the user launches the app from a closed state. In embodiments, the launch screen may only be displayed until the app is finished loading into memory. For example, the app logo 166 (otherwise referred to herein as an "app title") may stay on screen for several seconds, then automatically transition to a login or authentication page. However, in certain embodiments, such transition may happen immediately if users touch anywhere on the screen of their computing device. In embodiments, users who are already logged into their account (e.g., on their respective user computing device 128) would not be presented with a login prompt. Rather, they may be moved directly to a main chart or Top 50 page (see, for example, FIG. 3). Users who are not logged may be prompted by a pop up login box. The pop-up box may preferably mimic the default style of the respective operating system used on the respective user computing device 128. Preferably, no other functions within the app should be accessible until the user has logged in or otherwise authenticated.

An authentication page (not shown) may be displayed upon launch if the user is not currently logged into the app via their respective social media account. The authentication page may include, for example, a button to initiate the social media account authentication process (e.g., specific to the user's OS version and whether or not they have logged into their social media account vie their OS settings). In preferred embodiments, once the user has authenticated, they will not log in again until they have explicitly logged out.

Figure 3:
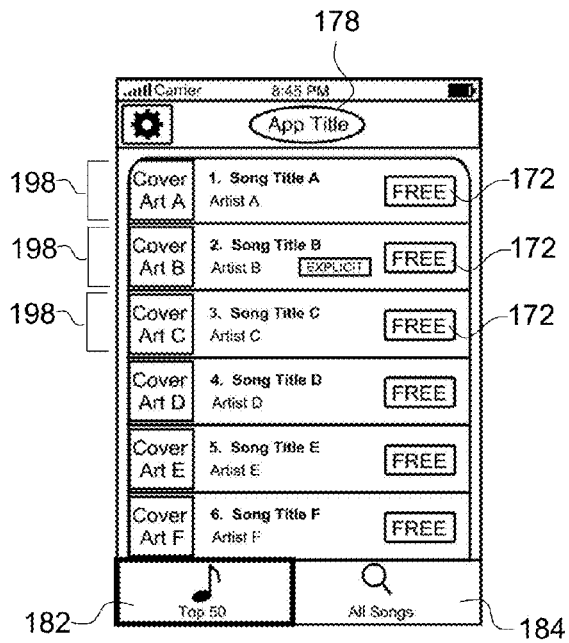
FIG. 3 illustrates an example of a top 50 list view presented in accordance with one embodiment of the present invention, whereby the list may be navigated and the respective digital content items previewed.

Referring to FIG. 3 for illustration, the Top 50 view (or equivalent) may be the default view of the app displaying immediately after launch. Referring to FIG. 2, the Top 50 listing may be configured to show the up-to-date handpicked songs chosen by the administrator 130 or operator of the system 124. Alternatively or in addition, the choice and position of the Top 50 songs may be either manually input, based on an existing third-party chart, automatically fed by a partnering music distributor's chart, or after enough data has been gathered the chart may be internalized by the system 124 to reflect most popular songs redeemed by all users of the app 138. This list may allow the user to scroll through the songs (or other digital content items), preview them, and navigate to their respective redemption view. In preferred embodiments, the navigation bar 156 at the top of the view may display the app title 178 and a button (e.g., the gear button) which segues into a setting page (as shown, for example, at FIG. 11). The tab bar at the bottom of the view displays two selectable tabs, one for Top 50 and the other for search (182 and 184, respectively). The user can toggle between these two tabs to view the handpicked Top 50 songs or to search the entire catalogue of a respective digital content store for specific titles and artists.

In particular embodiments, on the Top 50 (or "main chart") page, a logo or other trademark of a sponsoring advertiser may appear under or near, for example, a selection icon 172 in visual association with the song being sponsored by the advertiser.

Referring again to FIG. 3, the Top 50 table view displays a cell 198 for each of the songs chosen, for example, by the administrator 130 or an operator of the system 124. This list of songs may be retrieved from the server 126 each time the app 126 is launched. Each table view cell 198 may display a single song (or other digital content item). The cell content (e.g., album art, artist name, song title, etc.) may be retrieved from the digital content store (e.g., iTunes® Store) using the song identifier included in the song list retrieved from the server 126. Such cell content may be referred to as content datasets, and in certain embodiments may be input and stored within or in communication with the server 126. Tapping anywhere within the cell 198 (except the selection icon 172) may initialize the song preview. The album (or "cover") art space may display the art associated with the song, and may transition into an animated song preview controller when the preview is loading or playing. The respective user may tap here again while the audio is loading or playing to stop the preview. The selection icon 172 may initially display "FREE." If the user taps this button, it may animate to display "REDEEM." If the user taps again, the app may segue into the song redemption view (an example of which is depicted in FIG. 6).

Figure 4:
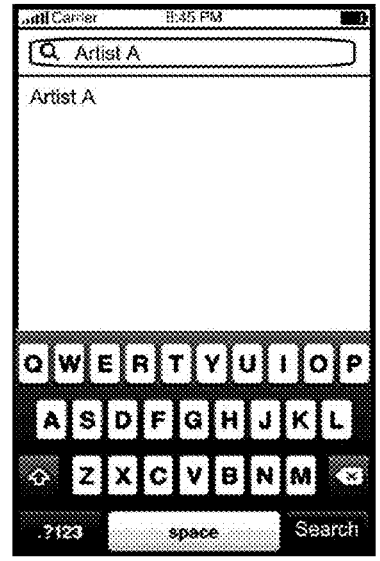
FIG. 4 illustrates an example of a search view in accordance with one embodiment of the present invention, whereby the search view enables a user to search a digital content store catalog.
Figure 5:
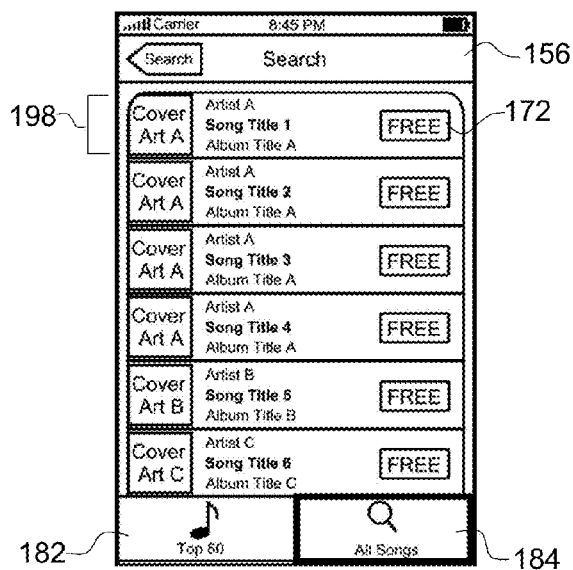
FIG. 5 illustrates an example of a search results view, whereby the search results may be navigated and the respective digital content items previewed similarly to that of the top 50 view.

Referring to FIG. 5, the Search view may be provided to allow users to search the entire digital content store catalog. The search results may be navigated and previewed in the same manner as the Top 50 view. The navigation bar 156 in this page may display a search box (or search button leading thereto, as illustrated in FIG. 4), where users can type in their queries. Referring to FIG. 4, once the user taps the search button or selects a result from the results list, the navigation bar may display a back button to the search box and "search" as its title. The results list (e.g. above the keyboard if FIG. 4) may display the matching results from the digital content store API. Selecting a result may be the equivalent of typing in that specific search query and tapping the search button from the keyboard.

Figure 6:
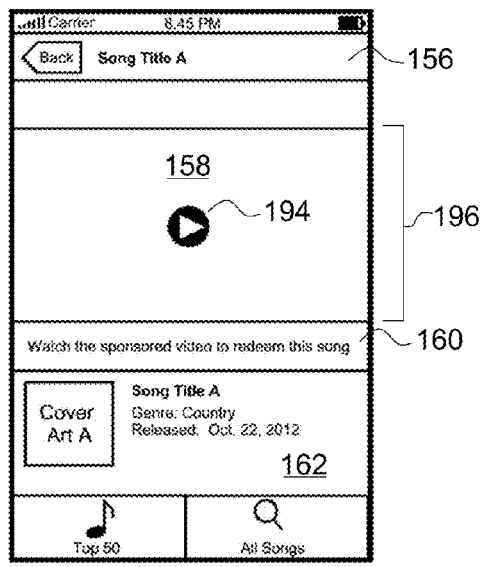
FIG. 6 illustrates one example of a digital content item redemption view, whereby the user is able to earn the item of digital content by watching, for example, a streaming video advertisement.

Referring to FIG. 6, a song redemption view may display song details and allow the user to redeem the song by watching, for example, a video advertisement. The user can navigate to this view by, for example, twice tapping the selection icon 172 for a given song from either the Top 50 or Search views. The ad media content item (e.g., video advertisement) may be retrieved from a video sharing website such as YouTube®. In this view, the navigation bar may display the name of the song and a back button to the previous view. A video thumbnail may be provided (for example at 158). The video thumbnail may display a single frame from the video advertisement, overlaid with a play button 194 to start the video. A song details section 162 may show detailed song and artist information for the selected song. An instructions section 160 may prompt the user with instructions on how to redeem the song. This section may update with new instructions if the user does not view the requisite amount of the video advertisement.

When the play button is tapped, a separate video view (not shown) may be entered to maximize the usage of the screen area of the user computing device while displaying the streamed video advertisement. The media item URL (e.g., the video URL) may be retrieved from the server 126 along with the song identifier. The video may then be streamed from a respective video-content website (e.g., YouTube®) via a respective API. The video may be overlaid with standard video control elements. In embodiments, Previous and Next buttons, as well as video scrubbing, may be disabled. In particular embodiments, a user's attempt to stop or fast-forward the video before it completes may result in a pop up box (or the like) with text reminding the user to finish watching the video. In certain embodiments, as a work-around in the event that the embedded video's code cannot be altered, a timed, but phantom layer may be created so that if a user presses the next (or similarly disruptive) button before a complete ad impression period (e.g., 30 seconds) has passed, they will be prompted with a "finish watching" message.

Referring to FIG. 9, an advertiser landing view may be a modal view that may, for example, slide up from the bottom of the screen after the conclusion of the video advertisement. The majority of the view may contain a webview directed to the advertiser's mobile web page. The web URL (also referred to herein as an ad landing page URL) may be retrieved by the app 136 from the server 126 along with the song identifier. The webview may display, for example, HTML retrieved from the advertiser's mobile website. The navigation bar of this view may show the advertiser as the title, as well as a "Done" or "Continue" button. Tapping the Done button may dismiss the landing view and again reveal the song redemption view beneath it. In the alternative, tapping the Continue button may take the user to a social media page, such as the one shown in FIG. 10.

The user may be presented with CAPTCHAs after a certain number of redemption within a given timeframe as a measure to prevent script abuses. CAPTCHAs may be in the form of numbers and letters recognition, swipe pattern capture, etc. After a certain number of failed attempts, the user account may be banned for a specified amount of time. In addition, user accounts may be banned upon detection of any attempts to run $3^{rd}$ party scripts to automatically complete engagements.

The Redeem button 170 may send a POST request to the server 126 containing information about the user and the song redeemed (e.g., in a user info database 144 and the redemption database 150 shown in FIG. 2). The user may be presented with a popup alert saying that the song has been redeemed. An "Earn Another Song" button may be provided to dismiss the current view and segue back to the Top 50 or Search view, depending on which was used to redeem the current song.

Figure 11:
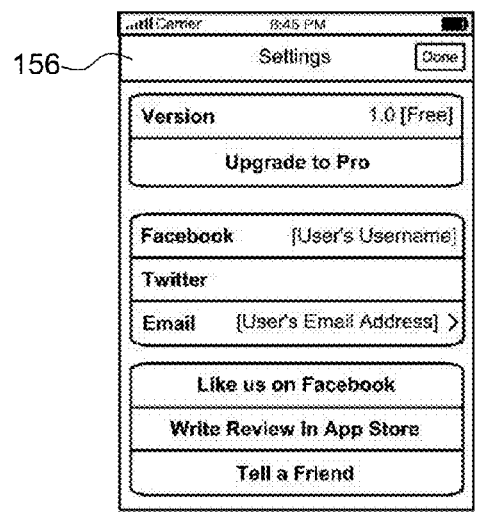
FIG. 11 illustrates one example of a user settings view.

Referring to FIG. 11, a Settings view may display app and user information, and may include links to various functions. The view may be accessed by tapping, for example, the gear icon in the navigation bar from the Top 50 or Search views. The navigation bar may show the title "Settings" as well as a "Done" button, which dismisses the view and reveals the page beneath. The email line displays the email address where redemption codes will be sent. The user's email address may be automatically pulled from its social network account. The "Like" button may open a social network fan page of the app provider.

In particular embodiments, a user may be presented with a profile page where they are asked to enter certain personalized information (which, for example, may form all or part of the user registration data). This information may include one or more of the user's email address, social media usernames, age, gender and zip code. Upon completion, the user's selection of a "save," "done," or equivalent icon may direct the user to a page which allows them paid or free access to an upgraded version.

Referring to FIG. 9 for illustration, in certain embodiments, users may land back on the landing page when they return to the app 136 from song redemption via email or the music distributor's own app. The page may be powered by the operating system's default web browser, and may be embedded within the app. In other embodiments, users may land on the landing page post redemption or as digital contents are being downloaded for additional impressions and engagement period.

Referring to FIG. 8, the content of the redemption email may be fully customizable to the advertiser (but may preferably include a download button or link with the music distributor's redemption code for their song). The redemption button 170 in the email may be hyperlinked to a specific redemption code of the partnering music distributor. Touching the button may exit the mail app and launch, for example, the iTunes® app, and direct users to either the sign in page (for users not logged in) or to the redeem page (for those already logged in).

A player page may show the redeemed song being played in the default music app. Amazon, for example, currently supports a browser-accessible cloud player after song redemption via Amazon mp3. In certain embodiments, this type of capability may be embedded within the app 136 of the present invention. It is envisioned that particular embodiments will stay up to date on the streaming options from the partnering music distributors and with therefore be ready for integration when those options become available.

Advertiser Self-Serve Platform

Advertisers with a web presence may be provided with a login and platform enabling them to input their campaign data. Such campaign data may include, for example, their logo (via upload or web link), ad landing page URL, ad media item URL, "thank you" pop up message and ad message graphic for inclusion with the redemption emails. One or more algorithms may be provided which allow advertisers to target users (and bid on access to such users) by virtue of target parameters such as demographics, location and keywords.

Advertiser General Work-Flow

Certain embodiments may allow advertisers to customize their campaigns by way of, for example, a self-serve platform or alternative medium, such as a live representative or a simple fillable form. By way of non-limiting example, the advertiser may provide, for each campaigned, one or more of the following: (a) an advertisement video file, or a URL for the video, (b) a landing page URL, (c) a logo, (d) one or more links to the advertiser's social profile(s), (e) an email (in html) or custom text email message, and (I) a campaign budget.

Moreover, in particular embodiments, advertisers may be presented with multiple targeting options, including one or more of the following: location (in profile), real-time location, gender, age, interests (e.g., as defined by Facebook® "Likes" or user-generated contents as tweets and posts), "social word cloud" (e.g., as detailed below), and the like.

In particular preferred embodiments, once the campaign begins running, advertisers may have the ability to pause and start the campaign, make changes to their campaign (including budget), and have access to the most up-to-date analytics.

Advertiser Analytics

In preferred embodiments, analytics available to the advertiser may include detailed analysis of user engagements at each engagement point using a variety of metrics such as CPM, CPE, CTR, and CPC. Alternatively or in addition, certain systems and methods herein may provide advertisers with analytics of the engaged users' demographics, such as the percentage of males/females, or the number of engaged users at respective geographic locations. Further in the alternative or in addition, embodiments of systems and methods herein may allow advertisers to access the engaged users' data, such as the users' email address or Facebook® profile.

Third Party Integration

The systems and methods described herein are adaptable to integrate with (e.g., comprise or be comprised by) a variety of platforms (e.g., hosting platforms) currently operated by third parties. Adaptations may take various forms, depending on the nature of the hosting platform. For example, the distribution components and processes may be different if the hosting platform is capable of dynamically generating content redemption codes in real time, thus rendering a server or database 150 to store redemption codes potentially unnecessary. Non-limiting examples of various types of hosting platforms and how they may be integrated with or operate as part of the systems and methods discussed herein are listed below.

A music discovery platform such as Pandora®, Spotify®, Shazam®, Myspace®, and the like may integrate with the systems and methods disclosed herein, thereby making such systems and methods part of its current user flow by, for example, offering its users an option to redeem songs of interest. A respective user option may take the form of, for example, a gesture controlled button or drop down option. Upon indication of user interests in redemption, the hosting platform would serve engagements provided by embodiments of the present invention, including for example: video page, landing page, social engagement page, redemption page, followed by the distribution of songs to its users.

In addition to engagement side integration, the music discovery platform may also facilitate the distribution internally. For example, if the platform has sufficient resources to host a virtual music store, it may distribute songs to its users via. direct links rather than relying on a third party content distributor Digital music retailers like iTunes®, Google Play®, Amazon MP3®, etc. may integrate systems or methods described herein into their virtual stores by offering their users an alternative option to redeem, rather than to purchase, their contents. Upon redemption confirmation, these retailers may serve engagements by way of one or more systems and methods described herein, followed by the distribution of the user-selected content via their normal distribution processes.

Advertising entities, such as Apple iAds®, Kiip®, Millenial Media®, may integrate with certain systems and methods in accordance with the present invention by incorporating some or all of their own engagement elements, such as banner ads, app installs, and the like, to bring their users content of higher value or to increase their revenue generated by user engagements.

Direct Link Redemption

Certain embodiments may enable users to be rewarded with direct links to download contents from a third party distributor upon completion of the prescribed ad impression period. These links may be stored in or generated on demand by the distributor's server database. A server provided by an operator of a system described herein may distribute the stored direct links to users through its own servers. Alternatively, it may also make calls to the distributor's server to generate link, then distribute to its users. These direct links may be distributed to users via email as well as embedded into a button on the redemption page to be opened by the in-app or external web browser. Users may be prompted to authenticate their identity by the direct link landing page and these direct links may be re-accessed at later times, across different devices, by the same user.

"Social Word Cloud" Targeting

Certain systems and methods in accordance with the present invention may aggregate user demographics data including but not limited to age, gender, locations, interests, posts, Likes (Facebook®), Follows (Twitter®), and the like through APIs from connected social networks, and graphically organize common and connected data into "Social Word Clouds."

Each unique demographics data point may preferably have its own cloud, and the Social Word Cloud sizes may vary depending on the number of users with matching demo data. The Word Cloud may be presented as part of the analytics delivered to advertisers to provide recommendations for improving their targeting practices and marketing efficiencies. The Word Cloud may also be presented as a targeting tool for advertisers to graphically select the demographics they wish to target in their campaigns.

Ad Choice

Figure 12A:
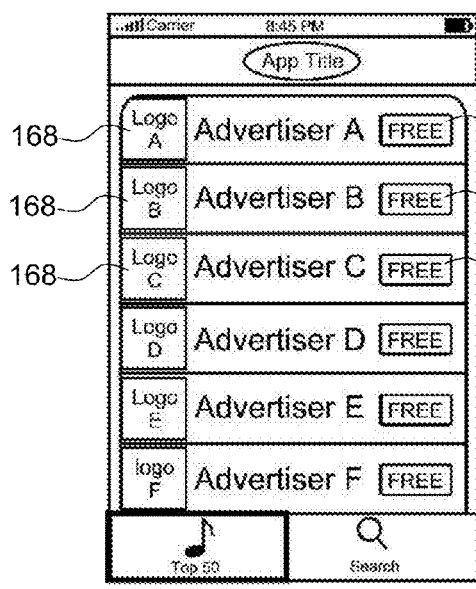
FIG. 12A illustrates one example of an ad choice page, wherein matching advertisers are presented to a user in a scrollable list.
Figure 12B:
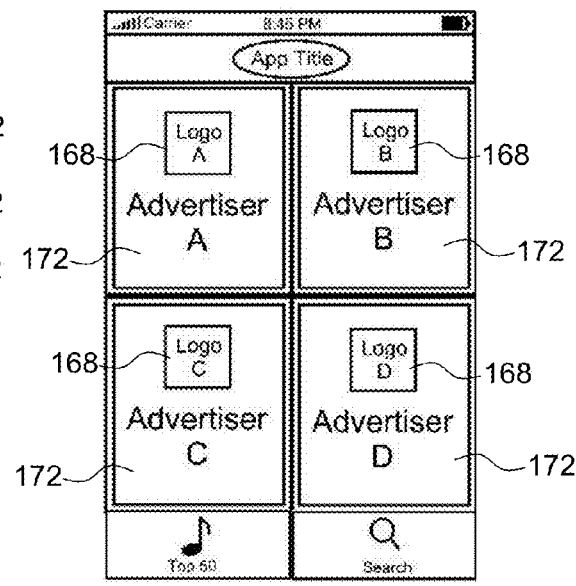
FIG. 12B illustrates one example of an ad choice page, wherein matching advertisers are presented in square-shaped blocks.

In accordance with particular embodiments, users may presented with an Ad Choice Screen after selecting a song for redemption. This screen may contain, for example, a list of advertisers whose targeted demographics matches that of the user. Referring to FIGS. 12A and 12B for non-limiting illustration, the matching advertisers may be presented to users in, for example, a scrollable list of horizontal rows or in square shaped blocks. Matching advertisers may preferably be displayed in order of the relevance of their ad, as determined, for example, by the overall number of times the advertisers' campaigns have been selected in the past. The system may load the selected advertiser's campaign and proceed to serve the respective video, landing page, engagement page, and email as discussed herein.

Data Mining Targeting

Systems and methods in accordance with certain embodiments of the present invention may aggregate and organize all of its user demographic data in a data mining fashion into searchable and targetable groups. Such data may include, for example, demographics extracted from users' social profiles such as gender, age, interests, and the like, as well as user' self-generated contents such as their status updates (Facebook®), their tweets (Twitter®), or their pins (Pinterest®).

Features of Credit System Embodiments

Certain additional embodiments may include special backend features, advertiser features and user features design to further optimize the effectiveness of the advertiser's campaign budgets.

On the backend of such embodiments: (a) each time a user signs up, all available user demographics data is extracted and stored on the server. Any data left "blank" automatically passes the match (so as to avoid alienating a large number of users over nonexistent user locations, etc.); (b) each time advertisers create a campaign, the server may run an analysis of the total number of matches, and apply credits to everyone with matching credentials; (c) when users initiate redemptions, the server will assembly an dispatch the advertiser's video, landing page and email; and (d) data will constantly be push refreshed. When advertiser's credits are close to running out, all remaining unclaimed credits will be removed from users. To prevent shock/misunderstanding, a "?" button may be provided next to credits which explains why credits fluctuate and the importance o redeeming as soon as possible.

On the advertiser end of these and other embodiments: (a) advertisers may initiate campaigns by specifying the demographics they would like to advertise to and the budget that they would like to spend on the campaign; (b) the advertisers customize their campaigns with one or more landing pages and videos; (c) advertisers are given the option to enable "repeat impressions" on the same user; (d) advertisers are shown the approximate total audience they are reaching—"repeated impressions" will have an infinite audience and each landing page or video advertisement will approximately double the amount of users that the advertisers reach; (e) advertisers will be given the total number of engagements served at each point, as well as their average CPE (which may be, for example less than $0.43); and (f) advertisers will see money spent is less than their specified budget, so as to prevent the overflow over redemptions over budget.

On the user end of such embodiments: (a) user will see the number of credits they have in settings, the number will be push-refreshed automatically but can also be manually refreshed via "pull down"; (b) "?" button next to credits which leads to an explanation as to why this number is dynamic; (c) users are free to redeem credits for any songs in the operator-defined catalog; (d) Top 50 songs will be delivered substantially instantaneously, while the rest are delivered within several hours.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of incentivized advertising, the method comprising:

providing an app for download via a network accessible app store and subsequently obtaining user registration information, the app configured to be downloaded to a computing device of a user equipped with a touch display and a separate web browser, the app configured to cause the computing device to at least:

communicate over a network with one or more servers hosting ads, one or more systems hosting respective libraries of digital content items, including at least a third party library of content, and an application server, wherein communication over a network with one or more systems hosting respective libraries of digital content items further comprises communication with a third party system for a first plurality of digital content items in a library of digital content items and access, via an application programming interface (API), metadata from the third party system, the first plurality of digital content items including at least music or movie digital content, wherein the third party system offers the first plurality of digital content items for sale;

provide a search user interface enabling the user to search the third party library of content items;

at least partly in response to a determination that the user has provided a user search query via the search user interface, transmit the user search query over the network to the third party system via the API;

receive over the network, via the API, search results resulting from a user search query of the third party library of content items, the search results comprising digital content items corresponding to the user search query;

provide a user navigable listing of the digital content items corresponding to the user search query via the touch display, the listing including respective digital content identifiers, associated touch activated selection icons, and associated touch activated preview controls;

access a preview having a pre-determined time length of a given digital content item from the third party system via the API in response to a determination that the user has activated an associated touch activated preview control;

in response to a determination that the user has activated an associated touch activated selection icon for a first digital content item in the listing of digital content items corresponding to the user search query, enable a streaming video advertisement from an advertisement server to be streamed from the advertisement server and presented to the user via the user computing device and inhibiting the user's ability to fast forward through the streamed advertisement when presented to the user;

after at least a portion of the video advertisement has been presented to the user, cause an engagement to occur between the user and a sponsor of the video advertisement at least partly in response to a user action, the engagement comprising at least one of a sponsor landing page engagement, a social media page engagement, or an email engagement;

at least partly in response to a determination that the video advertisement has been presented to the user for at least an ad impression period, the ad impression period less than a full length of the video advertisement and a determination that the engagement, comprising at least one of a sponsor landing page engagement, a social media page engagement, or an email engagement, occurred, enable the first digital content item to be downloaded without digital rights management (DRM), at the user computing device over the network from the third party system.

2. The method as defined in claim 1, wherein the search user interface enables the user to search the third party library of digital content items by artist name, album name, and song name.

3. The method as defined in claim 1, wherein the listing of digital content items comprises cover art, a song name, and an album name for respective content items.

4. The method as defined in claim 1, the method further comprising:
selecting content items of the third party library of digital content items that have a first popularity characteristic;
generating a list of content items of the third party library from the selected content items that have the first popularity characteristic;
providing the list of content items of the third party library from the selected content items that have the first popularity characteristic to the user computing device;
in response to a determination that the user has activated an associated touch activated selection icon for a second digital content item in the list of content items of the third party library from the selected content items, enabling a second streaming video advertisement to be presented to the user via the user computing device;
at least partly in response to a determination that the second video advertisement has been presented to the user for a second ad impression period, enabling the second digital content item to be received at the user computing device from the third party system.

5. The method as defined in claim 1, the method further comprising issuing a redemption code to the user, the redemption code being redeemable in exchange for at least one digital content item.

6. The method as defined in claim 1, the method further comprising acquiring from the third party a plurality of redemption codes for redemption of content items from the third party library for future distribution to users that have viewed advertisements.

7. The method as defined in claim 1, the method further comprising acquiring from the third party a plurality of redemption codes for redemption of content items from the third party library, for future distribution to users, wherein a given redemption code in the plurality of redemption codes is electronically transferable by the user to a second user, thereby allowing the second user to acquire a content item from the third party library using the redemption code.

8. The method as defined in claim 1, wherein the app is configured to generate user interfaces that mimic in appearance an operating system of the user computing device.

9. The method as defined in claim 1, further comprising automatically exhibiting, on the user computing device, an advertiser landing page after the video advertisement has been presented for at least the ad impression period.

10. The method as defined in claim 1, wherein the engagement is a social media page engagement.

11. The method as defined in claim 1, the method further comprising providing an interface enabling the sponsor to customize the engagement by specifying one or more of the following for the engagement:
a landing page URL,
a social profile link, or
email text,
wherein the engagement is based at least in part on the sponsor customization.

12. A computer storage system comprising a non-transitory storage device, said computer storage system having stored thereon executable program instructions that direct a computer system to at least:
communicate over a network with one or more servers hosting ads, one or more systems hosting respective libraries of digital content items, including at least a third party library of content, and an application server,
wherein communication over a network with one or more systems hosting respective libraries of digital content items further comprises communication with a third party system for a first plurality of digital content items in a library of digital content items, and
access, via an application programming interface (API), metadata from the third party system, the first plurality of digital content items including at least music, television, game, software application, or movie digital content, wherein the third party system offers the first plurality of digital content items for sale;
provide a search user interface enabling the user to search the third party library of content items;
at least partly in response to a determination that the user has provided a user search query via the search user interface, transmit the user search query over the network to the third party system via the API;
receive over the network, via the API, search results resulting from a user search query of the third party library of content items, the search results comprising digital content items corresponding to the user search query;
provide a user navigable listing of the digital content items corresponding to the user search query via the touch display, the listing including respective digital content identifiers, associated touch activated selection icons, and associated touch activated preview controls;
access a preview having a pre-determined time length of a given digital content item from the third party system via the API in response to a determination that the user has activated an associated touch activated preview control;
in response to a determination that the user has activated an associated touch activated selection icon for a first digital content item in the listing of digital content items corresponding to the user search query, cause a streaming video advertisement from an advertisement server to be streamed for presentation to the user and inhibit the user's ability to fast forward through the streamed advertisement when presented to the user;

after at least a portion of the video advertisement has been presented to the user, cause an engagement to occur between the user and a sponsor of the video advertisement at least partly in response to a user action, the engagement comprising at least one of a sponsor landing page engagement, a social media page engagement, or an email engagement;

at least partly in response to a determination that the video advertisement has been presented to the user for at least an ad impression period, the ad impression period less than a full length of the video advertisement and a determination that the engagement, comprising at least one of a sponsor landing page engagement, a social media page engagement, or an email engagement, occurred, enable the first digital content item to be downloaded without digital rights management (DRM) at a user computing device from the third party system.

13. The computer storage system of claim 12, wherein the search user interface enables the user to search the third party library of digital content items by artist name, album name, and song name.

14. The computer storage system of claim 12, wherein the listing of digital content items comprises cover art, a song name, and an album name for respective content items.

15. The computer storage system of claim 12, the executable program instructions further configured to direct the computer system to:
select content items of the third party library of digital content items that have a first popularity characteristic;
generate a list of content items of the third party library from the selected content items that have the first popularity characteristic;
provide the list of content items of the third party library from the selected content items that have the first popularity characteristic to the user computing device;
in response to a determination that the user has activated an associated touch activated selection icon for a second digital content item in the list of content items of the third party library from the selected content items, enable a second streaming video advertisement to be presented to the user via the user computing device;
at least partly in response to a determination that the second video advertisement has been presented to the user for a second ad impression period, enable the second digital content item to be received at the user computing device from the third party system.

16. The computer storage system of claim 12, the executable program instructions further configured to direct the computer system to issue a redemption code to the user, the redemption code being redeemable in exchange for at least one digital content item.

17. The computer storage system of claim 12, the executable program instructions further configured to direct the computer system to generate user interfaces that mimic in appearance an operating system of the user computing device.

18. The computer storage system of claim 12, the executable program instructions further configured to direct the computer system to acquire from the third party a plurality of redemption codes for redemption of content items from the third party library for future distribution to users that have viewed advertisements.

19. The computer storage system of claim 12, the executable program instructions further configured to direct the computer system to acquire from the third party a plurality of redemption codes for redemption of content items from the third party library, for future distribution to users, wherein a given redemption code in the plurality of redemption codes is electronically transferable by the user to a second user, thereby allowing the second user to acquire a content item from the third party library using the redemption code.

20. The computer storage system of claim 12, the executable program instructions further configured to direct the computer system to automatically exhibit, on the user computing device, an advertiser landing page after the video advertisement has been presented for at least the ad impression period.

21. The computer storage system of claim 12, wherein the engagement is a social media page engagement.

22. The computer storage system of claim 12, the executable program instructions further configured to direct the computer system to provide an interface enabling the sponsor to customize the engagement by specifying one or more of the following for the engagement:
a landing page URL,
a social profile link, or
email text,
wherein the engagement is based at least in part on the sponsor customization.

23. A system comprising:
at least one computing device;
a computer storage system comprising a non-transitory storage device, said computer storage system having stored thereon executable program instructions that direct a computer system to at least:
communicate over a network with one or more servers hosting ads, one or more systems hosting respective libraries of digital content items, including at least a third party library of content, and an application server,
wherein communication over a network with one or more systems hosting respective libraries of digital content items further comprises communication with a third party system for a first plurality of digital content items in a library of digital content items;
access, via an application programming interface (API), metadata from the third party system, the first plurality of digital content items including at least music, television, game software application, or movie digital content, wherein the third party system offers the first plurality of digital content items for sale;
provide a search user interface enabling the user to search the third party library of content items;
at least partly in response to a determination that the user has provided a user search query via the search user interface, transmit the user search query over the network to the third party system via the API;
receive over the network, via the API, search results resulting from a user search query of the third party library of content items, the search results comprising digital content items corresponding to the user search query;
provide a user navigable listing of the digital content items corresponding to the user search query via the touch display, the listing including respective digital content identifiers, associated touch activated selection icons, and associated touch activated preview controls;
access a preview having a pre-determined time length of a given digital content item from the third party system via the API in response to a determination that the user has activated an associated touch activated preview control;

in response to a determination that the user has activated an associated touch activated selection icon for a first digital content item in the listing of digital content items corresponding to the user search query, cause a streaming video advertisement from an advertisement server to be streamed for presentation to the user via a user computing device and inhibit the user's ability to fast forward through the streamed advertisement when presented to the user;

after at least a portion of the video advertisement has been presented to the user, cause an engagement to occur between the user and a sponsor of the video advertisement at least partly in response to a user action, the engagement comprising at least one of a sponsor landing page engagement, a social media page engagement, or an email engagement;

at least partly in response to a determination that the video advertisement has been presented to the user for at least an ad impression period and a determination that the engagement, comprising at least one of a sponsor landing page engagement, a social media page engagement, or an email engagement, occurred, enable the first digital content item to be downloaded without digital rights management (DRM) at the user computing device from the third party system.

24. The system of claim 23, wherein the search user interface enables the user to search the third party library of digital content items by artist name, album name, and song name.

25. The system of claim 23, wherein the listing of digital content items comprises cover art, a song name, and an album name for respective content items.

26. The system of claim 23, the executable program instructions further configured to direct the computer system to:
 select content items of the third party library of digital content items that have a first popularity characteristic;
 generate a list of content items of the third party library from the selected content items that have the first popularity characteristic;
 provide the list of content items of the third party library from the selected content items that have the first popularity characteristic to the user computing device;
 in response to a determination that the user has activated an associated touch activated selection icon for a second digital content item in the list of content items of the third party library from the selected content items, enable a second streaming video advertisement to be presented to the user via the user computing device;
 at least partly in response to a determination that the second video advertisement has been presented to the user for a second ad impression period, enable the second digital content item to be received at the user computing device from the third party system.

27. The system of claim 23, the executable program instructions further configured to direct the computer system to issue a redemption code to the user, the redemption code being redeemable in exchange for at least one digital content item.

28. The system of claim 23, the executable program instructions further configured to direct the computer system to generate user interfaces that mimic in appearance an operating system of the user computing device.

29. The system of claim 23, the executable program instructions further configured to direct the computer system to acquire from the third party a plurality of redemption codes for redemption of content items from the third party library for future distribution to users that have viewed advertisements.

30. The system of claim 23, the executable program instructions further configured to direct the computer system to acquire from the third party a plurality of redemption codes for redemption of content items from the third party library, for future distribution to users, wherein a given redemption code in the plurality of redemption codes is electronically transferable by the user to a second user, thereby allowing the second user to acquire a content item from the third party library using the redemption code.

31. The system of claim 23, the executable program instructions further configured to direct the computer system to automatically exhibit, on the user computing device, an advertiser landing page after the video advertisement has been presented for at least the ad impression period.

32. The system of claim 23, further comprising the user computing device.

33. The system of claim 23, wherein the engagement is a social media page engagement.

34. The system of claim 23, the executable program instructions further configured to direct the computer system to provide an interface enabling the sponsor to customize the engagement by specifying one or more of the following for the engagement:
 a landing page URL,
 a social profile link, or
 email text,
 wherein the engagement is based at least in part on the sponsor customization.

* * * * *

UNITED STATES PATENT AND TRADEMARK OFFICE
CERTIFICATE OF CORRECTION

PATENT NO. : 9,633,363 B2  
APPLICATION NO. : 14/076103  
DATED : April 25, 2017  
INVENTOR(S) : Timothy James Price Page 1 of 1

It is certified that error appears in the above-identified patent and that said Letters Patent is hereby corrected as shown below:

In the Specification

In Column 3 at Line 53, Change "the the" to --the--.

In Column 12 at Line 20, Change "via." to --via--.

In Column 12 at Line 21, After "distributor" insert --.--.

In Column 12 at Lines 31-32, Change "Millenial" to --Millennial--.

In Column 13 at Line 47, Change "o" to --of--.

In the Claims

In Column 18 at Line 45, In Claim 23, change "game" to --game,--.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*